(12) United States Patent
Bollman et al.

(10) Patent No.: US 9,127,846 B2
(45) Date of Patent: Sep. 8, 2015

(54) COUPLING ASSEMBLY FOR USE WITH A VALVE ASSEMBLY

(75) Inventors: Robert Paul Bollman, LaGrange, KY (US); Gonzalo Luis Ocano, Louisville, KY (US); John Mark Chilton, Campbellsburg, KY (US); Rafael Martinez Olguin, Queretaro (MX); Carlos Arturo Garcia Casillas, Queretaro (MX)

(73) Assignee: General Electric Company, Schenectady, NY (US)

( * ) Notice: Subject to any disclaimer, the term of this patent is extended or adjusted under 35 U.S.C. 154(b) by 510 days.

(21) Appl. No.: 13/467,086

(22) Filed: May 9, 2012

(65) Prior Publication Data

US 2012/0305820 A1    Dec. 6, 2012

Related U.S. Application Data

(60) Provisional application No. 61/493,076, filed on Jun. 3, 2011.

(51) Int. Cl.
 *F24C 3/12* (2006.01)

(52) U.S. Cl.
 CPC .............. *F24C 3/126* (2013.01); *F24C 3/122* (2013.01); *Y10T 403/70* (2015.01)

(58) Field of Classification Search
 CPC .. F23N 2035/24; F23N 1/007; A47J 37/0713; F24C 3/122; F24C 3/126; F16K 31/44; F16K 31/60
 USPC .......... 251/90, 205, 207, 211, 285, 288, 292, 251/309–311; 137/343, 625.13, 625.15, 137/625.16, 625.19, 625.32; 126/39 R, 42, 126/39 N, 39 E, 52; 431/12; 74/553
 See application file for complete search history.

(56) References Cited

U.S. PATENT DOCUMENTS

| | | | |
|---|---|---|---|
| 3,994,608 A | | 11/1976 | Swiderski et al. |
| 4,253,486 A | * | 3/1981 | Hardin ............. 137/343 |
| 6,438,771 B1 | | 8/2002 | Donath, Jr. et al. |
| 7,156,370 B2 | | 1/2007 | Albizuri |
| 7,641,470 B2 | | 1/2010 | Albizuri |
| 7,651,330 B2 | | 1/2010 | Albizuri |
| 7,816,818 B2 | * | 10/2010 | Sellecchia ............. 307/326 |
| 7,950,384 B2 | | 5/2011 | Albizuri |
| 7,963,763 B2 | | 6/2011 | Albizuri |
| 2007/0113838 A1 | | 5/2007 | Czajka et al. |
| 2008/0289615 A1 | * | 11/2008 | Parrish ............. 126/25 R |
| 2009/0151505 A1 | | 6/2009 | Castillo |
| 2010/0089385 A1 | | 4/2010 | Albizuri |

FOREIGN PATENT DOCUMENTS

| | | |
|---|---|---|
| GB | 2130438 A | 5/1984 |
| GB | 2389638 B | 7/2004 |

* cited by examiner

*Primary Examiner* — Marina Tietjen
(74) *Attorney, Agent, or Firm* — Dority & Manning, P.A.

(57) ABSTRACT

A coupling assembly includes a keyed coupling configured to couple to a valve stem and a plate configured to couple to a knob. The keyed coupling includes a projection having a cross-sectional shape. The plate includes a keyed slot defined therethrough. The keyed slot is shaped to correspond to the cross-sectional shape of the projection to receive at least a portion of the projection when the plate is coupled to the valve stem.

20 Claims, 10 Drawing Sheets

COUPLING ASSEMBLY FOR USE WITH A VALVE ASSEMBLY

CROSS REFERENCE TO RELATED APPLICATIONS

This application claims the benefit of U.S. Provisional Application No. 61/493,076 filed Jun. 3, 2011, which is hereby incorporated by reference in its entirety.

BACKGROUND OF THE INVENTION

The embodiments described herein relate generally to valve assemblies for use with an appliance and, more particularly, to a coupling assembly for coupling a knob assembly to a predetermined valve assembly of the appliance.

At least some known valve assemblies include a knob that enables a user to select a function of the valve assembly. For example, cooking appliances include such knobs. Usually the knob indicates a power or heat, from High to Low, of a burner of the cooking appliance using indicia. Such knobs can be referred to as "normal knobs". Some cooking appliances include specialized burners and/or valve assemblies that have functions other than High to Low power or heat. Such specialized burners and/or valve assemblies have specialized knobs that indicate the functions thereof. However, known normal knobs and known specialized knobs couple to valve assemblies in the same way such that a normal knob may inadvertently be coupled to a specialized valve assembly, and vice versa.

BRIEF DESCRIPTION OF THE INVENTION

In one aspect, a coupling assembly is provided. The coupling assembly includes a keyed coupling configured to couple to a valve stem and a plate configured to couple to a knob. The keyed coupling includes a projection having a cross-sectional shape. The plate includes a keyed slot defined therethrough. The keyed slot is shaped to correspond to the cross-sectional shape of the projection to receive at least a portion of the projection when the plate is coupled to the valve stem.

In another aspect, a valve assembly is provided. The valve assembly includes a stem, a keyed coupling coupled to the stem and having a projection with a cross-sectional shape, a knob, and a plate coupled to the knob. The plate includes a keyed slot defined therethrough. The keyed slot is shaped to correspond to the cross-sectional shape of the projection to receive at least a portion of the projection when the plate is coupled to the stem.

In yet another aspect, an appliance is provided. The appliance includes a valve stem and a keyed coupling coupled to the valve stem. The keyed coupling includes a projection having a cross-sectional shape. A knob assembly is coupled to the keyed coupling and the valve stem. The knob assembly includes a plate coupled to a knob. The plate includes a keyed slot defined therethrough. The keyed slot is shaped to correspond to the cross-sectional shape of the projection to receive at least a portion of the projection.

In still another aspect, an appliance is provided. The appliance includes a plurality of different types of valves and a plurality of different types of knob assemblies. Each type of knob assembly corresponds to a type of valve. Each type of valve includes a projection having a respective cross-sectional shape, and each type of knob assembly includes a keyed slot having a shape corresponding to the cross-sectional shape of the projection of a respective type of valve assembly.

BRIEF DESCRIPTION OF THE DRAWINGS

FIGS. 1-19 show exemplary embodiments of the apparatus described herein.

DETAILED DESCRIPTION OF THE INVENTION

The embodiments described herein provide a coupling assembly that prevents a knob from being coupled to an inappropriate valve assembly. For example, a cooking appliance may include normal knobs and a plurality of different specialized knobs. To avoid coupling a normal knob to a specialty valve assembly, coupling a specialized knob to a normal valve assembly, and/or coupling a first type of a specialized knob to a second type of specialty valve, the coupling assemblies described herein include a keyed coupling and a keyed knob plate. As such, only a knob having a plate matching the keyed coupling can be coupled to a valve assembly.

When the cooking appliance includes a plurality of different types of valve assemblies, each type of valve assembly has a respective coupling assembly that is different than any other coupling assembly used on the other types of valve assemblies. Accordingly, the functions indicated on each type of knob will match the functions performed by the valve assembly to which the knob is coupled.

Further, the embodiments described herein enable knobs to be matched to valves without changing the shape of the valve stem. As such, manufacturing of the valves is simplified as compared to appliances having a plurality of types of valves each with a different shaped valve stem. Moreover, the coupling assembly described herein can be slid on to a valve stem without require extra tools, such as wrenches, to screw or otherwise fasten the coupling assembly to the valve stem. Accordingly, assembly of the valve, knob assembly, and knob is simplified as compared to valves having components screwed on to the valve stem.

Figure 1:
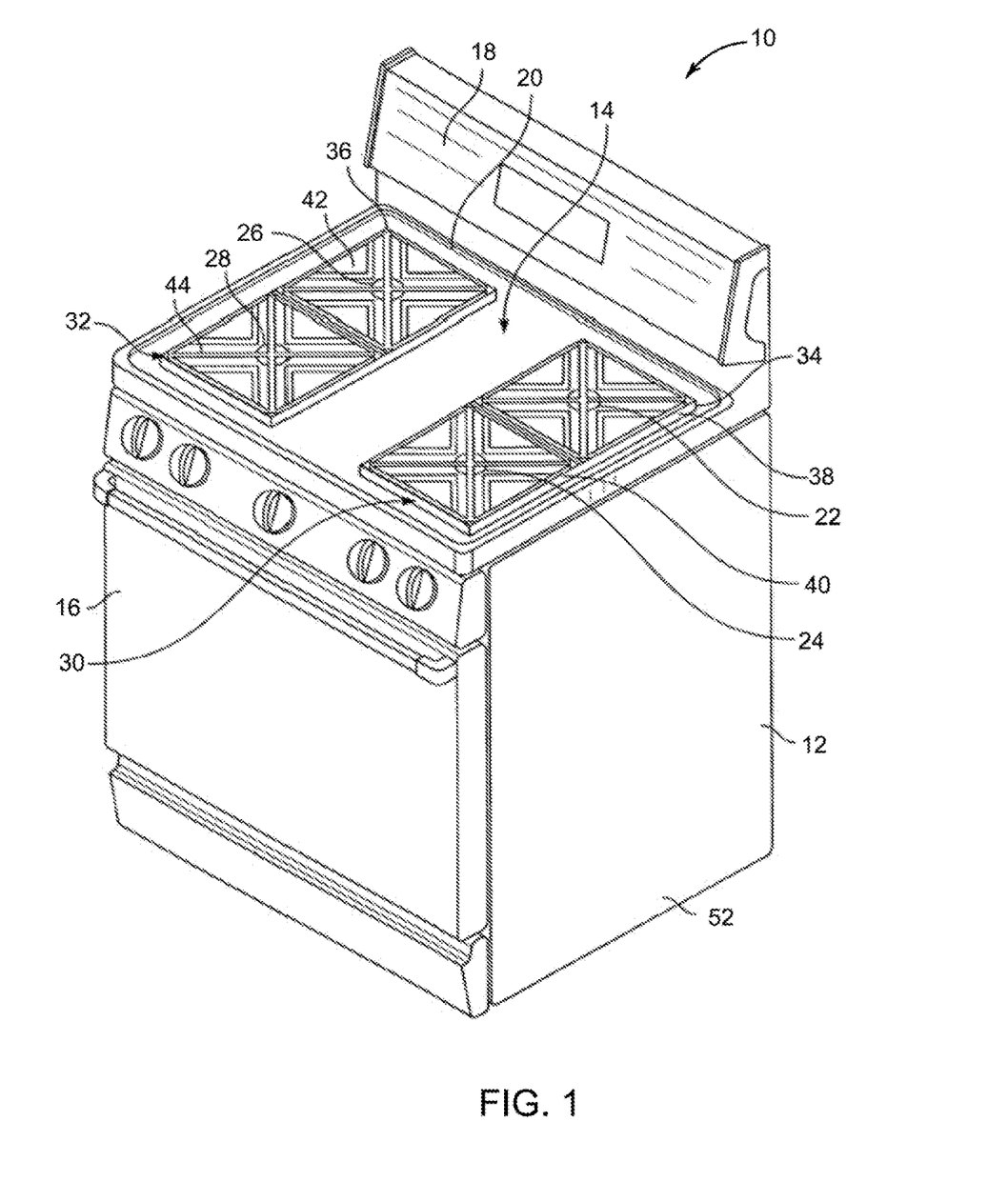
FIG. 1 is a perspective view of an exemplary free standing gas range.

FIG. 1 is a perspective view of a gas cooking appliance in the form of a free standing gas range 10 including an outer body or cabinet 12 that includes a generally rectangular cooktop 14. An oven (not shown) is positioned below cooktop 14 and has a front-opening access door 16. A range backsplash 18 extends upward from a rear portion 20 of cooktop 14 and includes various control selectors (not shown) for selecting operative features of heating elements for cooktop 14 and/or the oven. It is contemplated that the embodiments described herein are applicable, not only to cooktops which form the upper portion of a range, such as range 10, but to other forms of cooktops, such as, but not limited to, free standing cooktops that are mounted to kitchen counters and/or dual fuel cooking appliances, (e.g., a gas cooktop with an electric oven), as well as other appliances that include knobs. Therefore, gas range 10 is provided by way of illustration rather than limitation, and accordingly there is no intention to limit application of the embodiments described herein to any particular appliance or cooktop, such as range 10 or cooktop 14.

Cooktop 14 includes four gas fueled surface burners 22, 24, 26, 28, which are positioned in spaced apart pairs of burners 22, 24 and 26, 28 positioned adjacent each side of cooktop 14. Each burner 22, 24, 26, 28 extends upwardly through an opening in cooktop 14, and a grate assembly 30, 32 is positioned over each respective pair of burners, 22, 24 and 26, 28. Each grate assembly 30, 32 includes a respective frame 34, 36, and separate supporting grates 38, 40, 42, 44 are positioned above cooktop recessed areas and overlie respective burners 22, 24, 26, 28. Alternatively, cooktop 14 includes any suitable number of burners. Further, grate assembly 30 and/or 32 can be replaced by a griddle, grill, wok, and/or other suitable attachment for use with cooktop 14.

Figure 2:
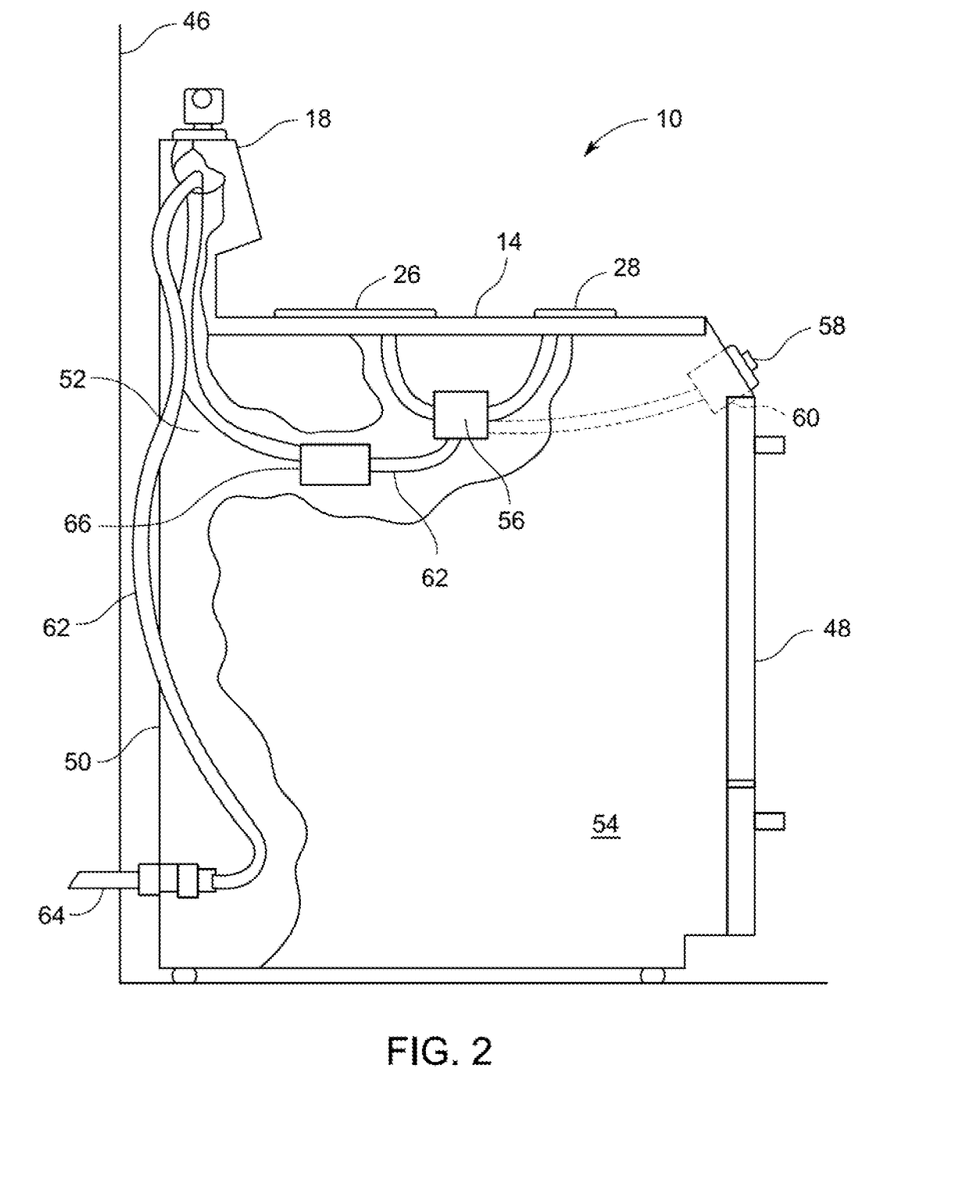
FIG. 2 is a side view of the gas range shown in FIG. 1 with a section of the cabinet removed.

FIG. 2 shows range 10 mounted adjacent a wall 46. Range 10 includes a front panel 48, a rear wall 50, laterally spaced side walls 52 and 54, and backsplash 18. Gas burners 22 (shown in FIG. 1), 24 (shown in FIG. 1), 26, and 28 of cooktop 14 are in selective flow communication with a gas line manifold 56. A plurality of burner control knobs 58 are mounted on front panel 48 of range 10 in front of cooktop 14 and are coupled to a gas valve 60. A gas appliance connector hose or gas supply line 62 is connected between a main supply line 64 and gas line manifold 56, and a gas lockout valve assembly 66 is connected to or in line with gas line manifold 56 along gas supply line 62. In one embodiment, gas valve assembly 66 regulates gas flow between main gas supply line 64 and gas manifold 56. While gas valve assembly 66 is illustrated coupled to gas supply line 62 between backsplash 18 and manifold 56, it is contemplated that gas valve assembly 66 may be located elsewhere in appliance 10, such as at a location at or near the main gas line connection to appliance 10.

Figure 3:
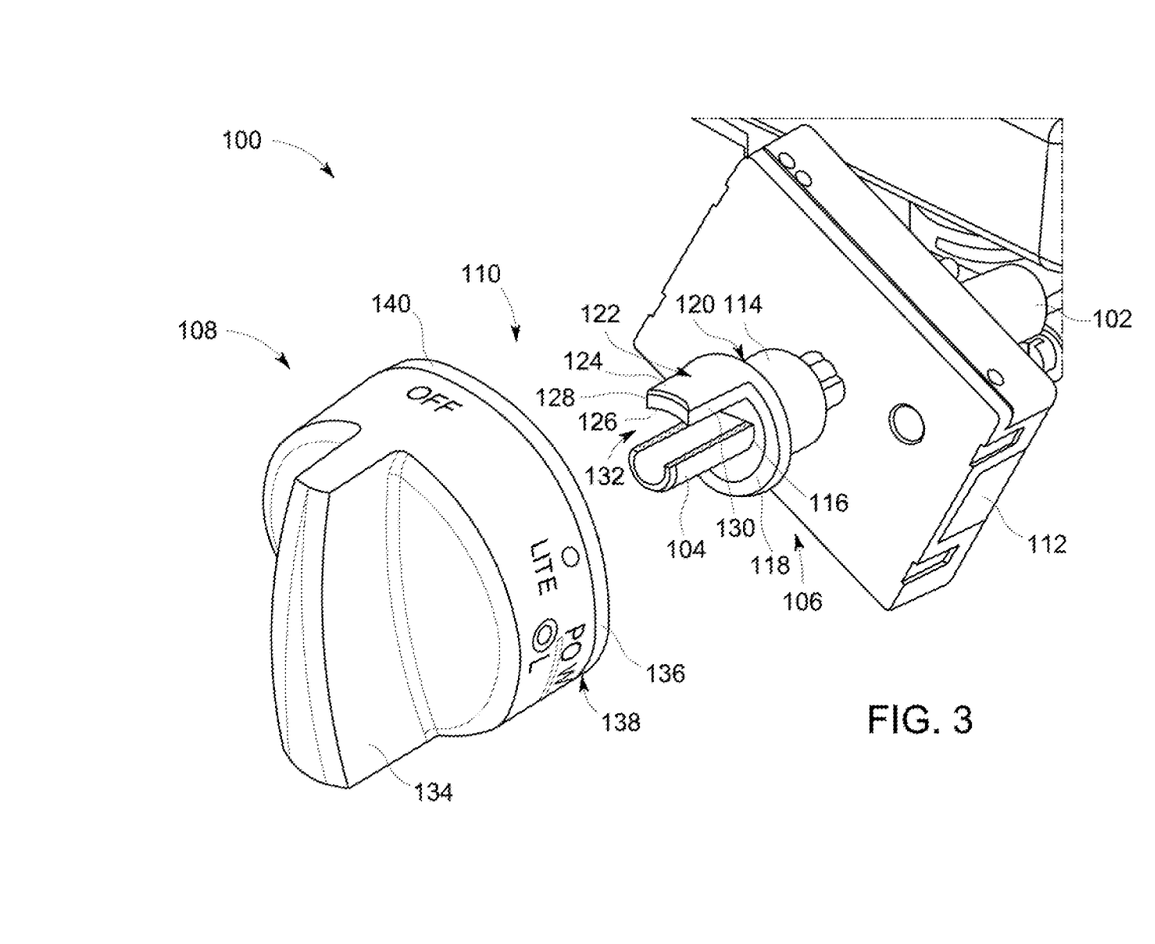
FIG. 3 is a perspective view of an exemplary valve assembly that may be used with the range shown in FIGS. 1 and 2.

FIG. 3 is a perspective view of an exemplary valve assembly 100 that may be used with range 10 (shown in FIGS. 1 and 2) as valve 60 and knob 58 (both shown in FIGS. 1 and 2).

Valve assembly 100 includes a valve 102 having a stem 104, a keyed coupling 106, and a knob assembly 108. Keyed coupling 106 and knob assembly 108 form a coupling assembly 110. In an alternative embodiment, coupling assembly 110 includes a stem having a cross-sectional shape and a knob assembly having a slot with a shape corresponding to the cross-sectional shape of the stem. In the exemplary embodiment, stem 104 has a substantially C-shaped cross-section. Alternatively, stem 104 has any suitable cross-sectional shape. In the exemplary embodiment, an ignition switch 112 is positioned along stem 104.

Keyed coupling 106 is configured to be coupled to stem 104. More specifically, keyed coupling 106 is one piece and includes a body 114 having a stem aperture 116 defined therethrough. Stem aperture 116 has a shape corresponding to a cross-sectional shape of stem 104. In the exemplary embodiment, stem aperture 116 has a D-shaped cross-section configured to receive the C-shaped cross-section of stem 104; however, it should be understood that stem aperture 116 has any suitable cross-sectional shape configured to receive stem 104 through body 114 of keyed coupling 106.

A flange 118 extends radially from one end 120 of body 114, and a projection 122 extends longitudinally from flange 118 such that projection 122 opposes body 114 with respect to flange 118. Projection 122 has a cross-sectional shape defined by an outer surface 124, an inner surface 126, and two side surfaces 128 and 130. The cross-sectional shape of projection 122 enables projection 122 to function as a key that allows only a particular knob assembly to be coupled to valve 102 and prevents other types of knob assemblies from being coupled to valve 102. As such, the cross-sectional shape corresponds to a type of knob assembly 108 that will be used with valve assembly 100, as described in more detail below. Projection 122 is positioned with respect to flange 118 and/or stem aperture 116 to define a gap 132 between inner surface 126 and stem 104 when stem 104 is inserted through keyed coupling 106. In an alternative embodiment, keyed coupling 106 is omitted and stem 104 is shaped to replace projection 122 such that stem 104 functions similarly to projection 122.

Knob assembly 108 includes a knob 134 and a plate 136. Knob 134 includes indicia 138, such as graphics and/or text, indicating an operation of valve 102 that is selectable by a user. Indicia 138 includes, for example, "Lite", a flame graphic, a power range graphic from "Hi" to "Low", "Boil", and/or any other suitable text and/or graphics. Indicia 138 are unique to a particular type of knob assembly 108. For example, a normal operation knob, a griddle knob, a dual-function knob, and a power boil knob each include different indicia 138 corresponding to functions of each type of valve and/or burner associated with a respective knob. Plate 136 is coupled to a rear side 140 of knob 134 and is configured to enable knob 134 to be coupled to an appropriate keyed coupling 106 to facilitate ensuring knob assembly 108 is properly paired with valve 102. In the exemplary embodiment, plate 136 includes a slot (not shown in FIG. 3) configured to receive projection 122 of an appropriate keyed coupling 106 and block knob assembly 108 from being coupled to an inappropriate keyed coupling, as described in more detail below. Knob assembly 108 is shown in more detail in FIG. 6. In an alternative embodiment, plate 136 is omitted and knob 134 includes a slot defined therethrough that functions similarly to the slot defined through plate 136.

Figure 4:
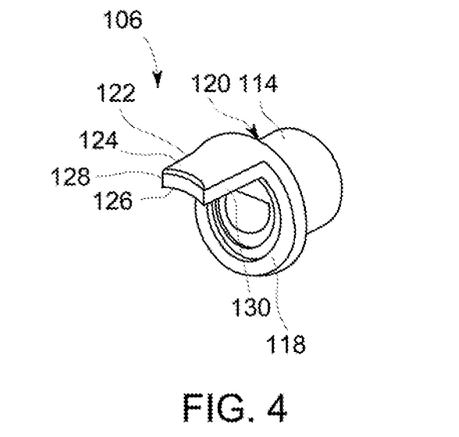
FIG. 4 is a perspective view of an exemplary keyed coupling that may be used with the valve assembly shown in FIG. 3.
Figure 5:
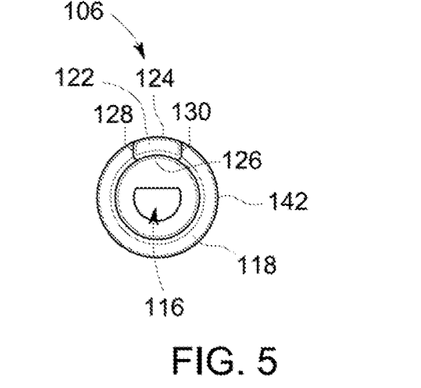
FIG. 5 is a front view of the keyed coupling shown in FIG. 4.

FIG. 4 is a perspective view of keyed coupling 106 that may be used with valve assembly 100 (shown in FIG. 3). FIG. 5 is a front view of keyed coupling 106. FIGS. 4 and 5 include reference numbers described above with respect to FIG. 3. As such, components 114, 120, 124, 126, 128, and 130 shown in FIGS. 4 and 5 are described above. Referring to FIGS. 4 and 5, keyed coupling 106 includes projection 122 having an arcuate cross-sectional shape. More specifically, projection 122 is shaped as a portion of an annular ring about a circumferential edge 142 of flange 118.

Figure 6:
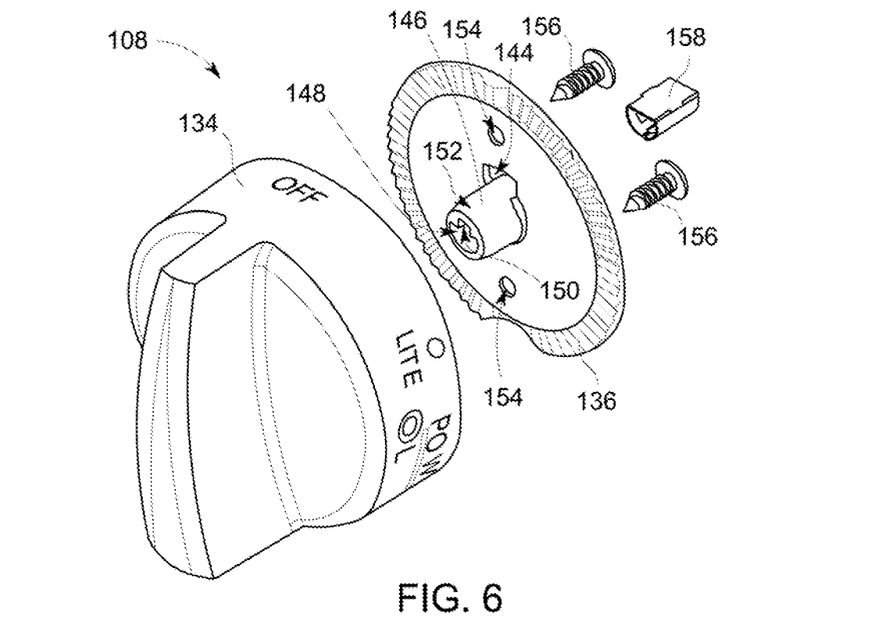
FIG. 6 is a perspective view of an exemplary knob assembly that may be used with the valve assembly shown in FIG. 3.

FIG. 6 is an exploded perspective view of knob assembly 108 that may be used with valve assembly 100 (shown in FIG. 3). In the exemplary embodiment, plate 136 includes a keyed slot 144 and a stem collar 146. Stem collar 146 includes a stem aperture 148 and a channel 150 defined therethrough. Stem aperture 148 is shaped to correspond to a cross-sectional shape of stem 104 (shown in FIG. 3), and channel 150 is continuous with stem aperture 148. Keyed slot 144 is defined adjacent collar 146 such that an upper portion 152 of collar 146 can be received in gap 132 (shown in FIG. 3) when knob assembly 108 is coupled to keyed coupling 106 (shown in FIG. 3). Keyed slot 144 has a shape that corresponds to a cross-sectional shape of projection 122 (shown in FIGS. 3-5) of keyed coupling 106. As such, keyed slot 144 is configured to receive at least a portion of a corresponding projection 122. Plate 136 further includes screw holes 154 configured to enable plate 136 to be coupled to knob 134 using fasteners 156. A reinforcing sleeve 158 is positioned within stem aperture 148.

In the exemplary embodiment, each type of knob 134 is coupled to a plate having a respective shape of keyed slot 144. As such, each type of knob assembly is distinguished from other types of knob assemblies by a shape of keyed slot 144. Accordingly, a plurality of different plates each having a different shaped keyed slot 144 is provided. The variety of plates allows each knob assembly to only be coupled to a corresponding keyed coupling that is associated with an appropriate type of valve for the functions illustrated on knob 134 using indicia 138.

Figure 7:
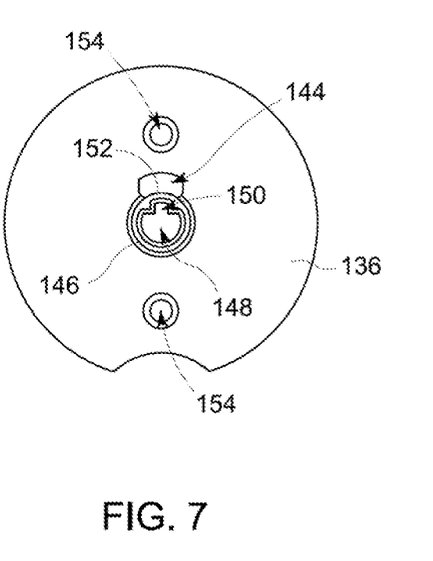
FIG. 7 is a front view of an exemplary plate that may be used with the knob assembly shown in FIG. 6.

FIG. 7 is a front view of plate 136 that may be used with knob assembly 108 (shown in FIG. 6). FIG. 7 includes reference numbers described above with respect to FIG. 6. As such, components 148, 150, 152, and 154 shown in FIG. 7 are described above. Referring to FIG. 7, plate 136 includes slot 144 that is shaped as a portion of an annular ring about stem collar 146. More specifically, slot 144 has a shape that is substantially similar to the cross-sectional shape of projection 122 (shown in FIGS. 3-5). As such, slot 144 is configured to receive projection 122 when knob assembly 108 is coupled to stem 104 (shown in FIG. 3).

Figure 8:
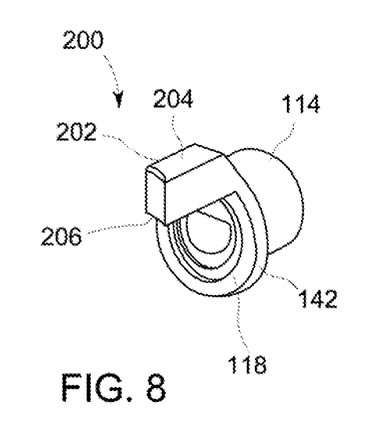
FIG. 8 is a perspective view of a first alternative keyed coupling that may be used with the valve assembly shown in FIG. 3.
Figure 9:
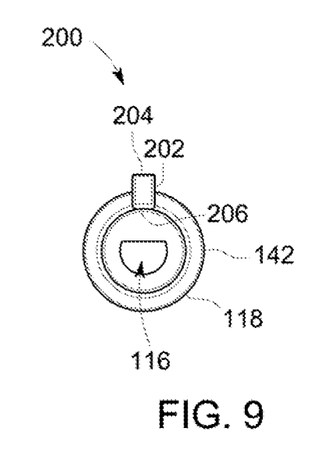
FIG. 9 is a front view of the keyed coupling shown in FIG. 8.

FIG. 8 is a perspective view of a first alternative keyed coupling 200 that may be used with valve assembly 100 (shown in FIG. 3) instead of keyed coupling 106 (shown in FIGS. 3-5). FIG. 9 is a front view of keyed coupling 200. Keyed coupling 200 is substantially similar to keyed coupling 106, except keyed coupling 200 includes a projection 202. As such, components shown in FIGS. 8 and 9 are labeled with the same reference numbers used in FIGS. 3-5. Projection 202 has a substantially quadrangular shape, such as rectangular or square. An outer surface 204 of projection 202 extends beyond circumferential edge 142 of flange 118. In the exemplary embodiment, an inner surface 206 of projection 202 is slightly arcuate; however, inner surface 206 can be substantially flat and/or have any other suitable contour.

Figure 10:
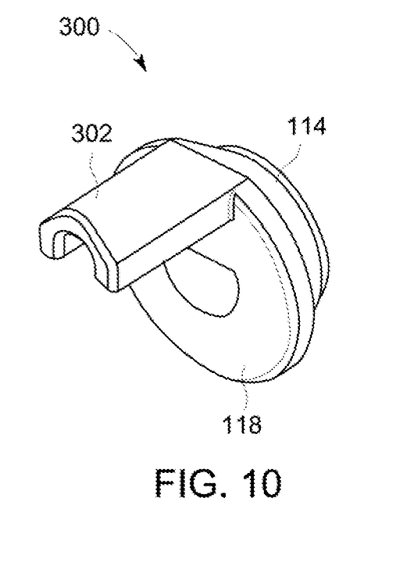
FIG. 10 is a perspective view of a second alternative keyed coupling that may be used with the valve assembly shown in FIG. 3.
Figure 11:
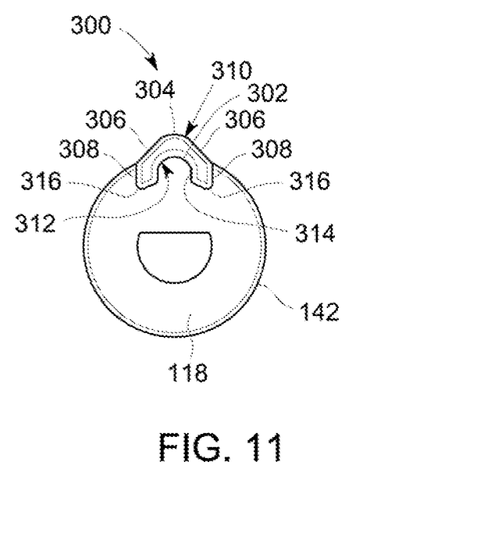
FIG. 11 is a front view of the keyed coupling shown in FIG. 10.

FIG. 10 is a perspective view of a second alternative keyed coupling 300 that may be used with valve assembly 100 (shown in FIG. 3) instead of keyed coupling 106 (shown in FIGS. 3-5). FIG. 11 is a front view of keyed coupling 300. Keyed coupling 300 is substantially similar to keyed coupling 106, except keyed coupling 300 includes a projection 302. As such, components shown in FIGS. 10 and 11 are labeled with the same reference numbers used in FIGS. 3-5. Projection 302 has a shape including a polygon having a curved apex 304, angled legs 306, and vertical legs 308 along an outer surface 310 and a U-shape 312 along an inner surface 314. Such a shape is referred to herein as a polygonal shape. In the exemplary embodiment, outer surface 310 of projection 302 extends beyond circumferential edge 142 of flange 118 at angled legs 306 and apex 304. Inner surface 314 of projection 302 is generally U-shaped having pointed ends 316; however, inner surface 314 can have any other suitable contour.

Figure 12:
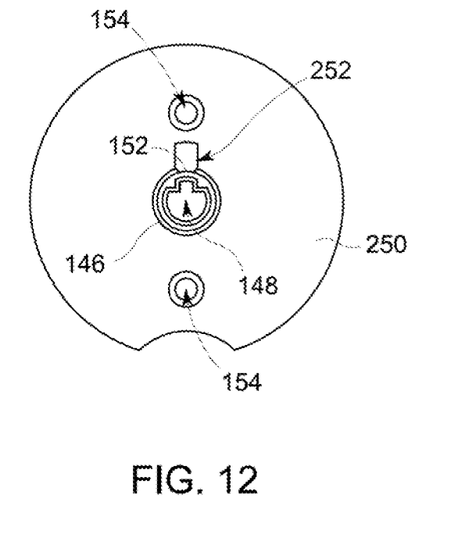
FIG. 12 is a front view of a first alternative plate that may be used with the knob assembly shown in FIG. 6.

FIG. 12 is a front view of a first alternative plate 250 that may be used with knob assembly 108 (shown in FIG. 6) instead of plate 136 (shown in FIGS. 6 and 7). FIG. 12 includes reference numbers described above with respect to FIG. 6. As such, components 148, 150, and 154 shown in FIG. 12 are described above. Referring to FIG. 12, plate 250 is substantially similar to plate 136, except plate 250 includes a keyed slot 252. As such, components shown in FIG. 12 are labeled with the same reference numbers used in FIGS. 6 and 7. Plate 250 includes slot 252 that is adjacent stem collar 146 at, for example, upper portion 152 of stem collar 146. Slot 252 is substantially quadrangle-shaped to correspond to the cross-sectional shape of projection 202 (shown in FIGS. 8 and 9). As such, slot 252 is configured to receive projection 202 when knob assembly 108 is coupled to stem 104 (shown in FIG. 3).

Figure 13:
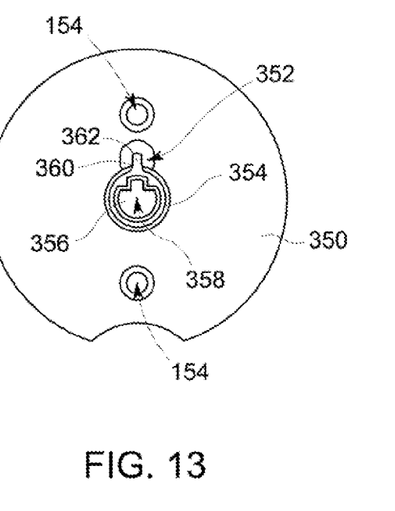
FIG. 13 is a front view of a second alternative plate that may be used with the knob assembly shown in FIG. 6.

FIG. 13 is a front view of a second alternative plate 350 that may be used with knob assembly 108 (shown in FIG. 6) instead of plate 136 (shown in FIGS. 6 and 7). Plate 350 is substantially similar to plate 136. As such, components shown in FIG. 13 are labeled with the same reference numbers used in FIGS. 6 and 7. FIG. 13 includes reference numbers described above with respect to FIG. 6. As such, component 154 shown in FIG. 13 is described above. Differences between plate 350 and plate 136 are that plate 350 includes a keyed slot 352 and a stem collar 354 rather than stem collar 146 (shown in FIGS. 6 and 7). Plate 350 includes stem collar 354 having an end wall 356 that defines a recess 358 within stem collar 354, rather than having an aperture defined through stem collar 354. Recess 358 is shaped similarly to stein aperture 148 (shown in FIGS. 6 and 7) and channel 150 (shown in FIGS. 6 and 7). End wall 356 prevents stem 104 (shown in FIG. 3) from extending through plate 350 into knob 134 (shown in FIG. 6).

Slot 352 is defined through plate 350 adjacent stem collar 354 at, for example, an upper portion 360 of stem collar 354. Slot 352 is polygon-shaped to correspond to the cross-sectional shape of projection 302, as shown in FIGS. 10 and 11 and described above. More specifically, slot 352 is polygonal shaped as described above and defines a ridge 362 that extends longitudinally along stem collar 354. As such, slot 352 is configured to receive projection 302 when knob assembly 108 is coupled to stem 104.

Figure 14:
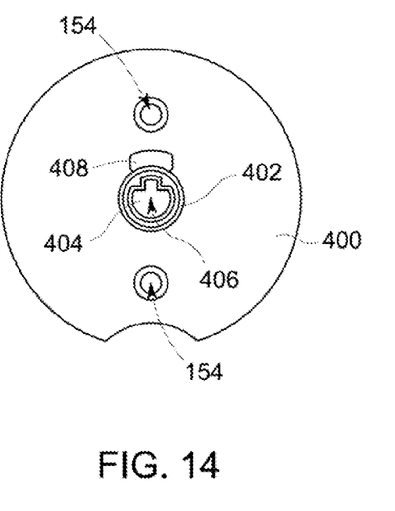
FIG. 14 is a front view of a third alternative plate that may be used with the knob assembly shown in FIG. 6.

FIG. 14 is a front view of a third alternative plate 400 that may be used with knob assembly 108 (shown in FIG. 6) instead of plate 136 (shown in FIGS. 6 and 7). Plate 400 is substantially similar to plate 136, except plate 400 does not include slot 144. Rather, plate 400 includes a stem collar 402 having an end wall 404 defining a recess 406 within stem collar 402. Recess 406 is shaped similarly to stem aperture 148 (shown in FIGS. 6 and 7) and channel 150 (shown in FIGS. 6 and 7). Stein collar 402 is configured to receive at least a portion of stem 104 (shown in FIG. 3) when knob assembly 108 is coupled to stem 104. End wall 404 prevents stem 104 from extending through plate 400 into knob 134 (shown in FIG. 6).

Further, a block 408 extends longitudinally outwardly from stem collar 402. Block 408 is shaped to prevent knob assembly 108 from being coupled to any keyed coupling, such as keyed coupling 106, 200, and/or 300 (shown in FIGS. 4, 5, and 8-11). For example, plate 400 is used with normal-functioning knobs that do not include indicia indicating a special function of the knob, valve, and/or burner. As such, the normal-function knob cannot be inadvertently used instead of a specialty knob because block 408 does not couple to a projection 122, 202, and/or 302 (shown in FIGS. 4, 5, and 8-11). Rather, when the normal-functioning knob assembly is to be used on a valve, the keyed coupling is omitted.

Figure 15:
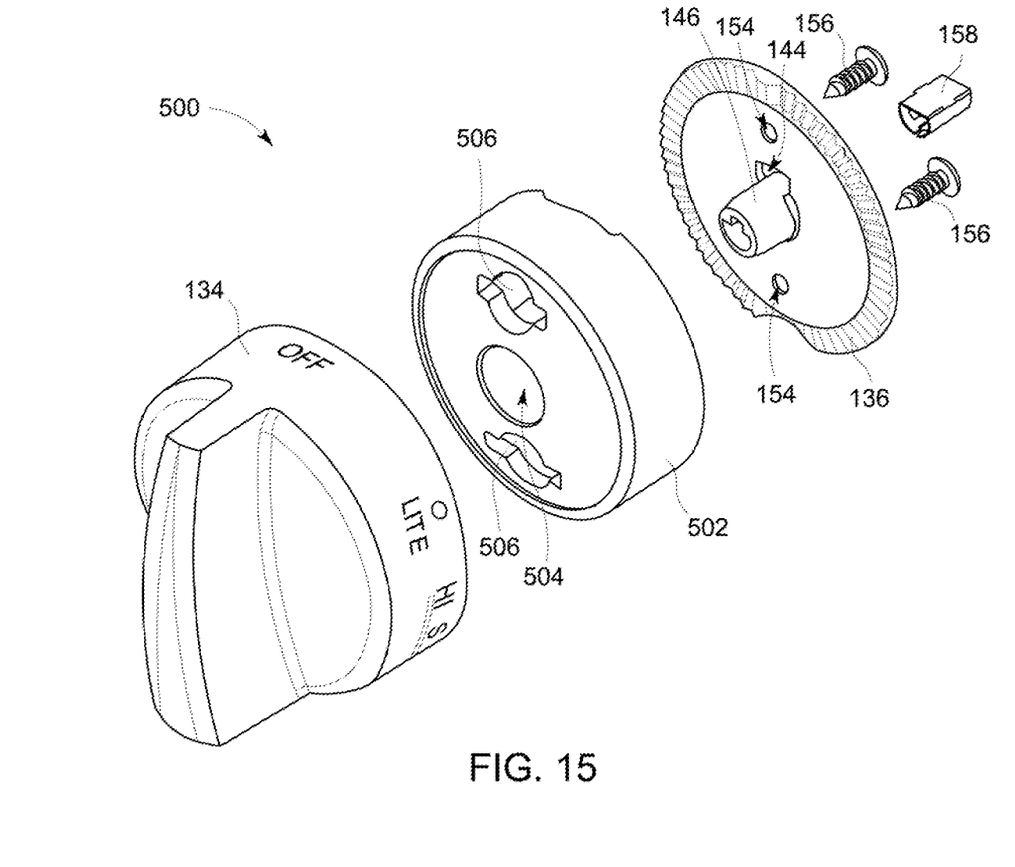
FIG. 15 is an exploded perspective view of a first alternative knob assembly that may be used with the valve assembly shown in FIG. 3.

FIG. 15 is an exploded perspective view of a first alternative knob assembly 500 that may be used with valve assembly 100 (shown in FIG. 3) instead of knob assembly 108 (shown in FIGS. 3 and 6). Knob assembly 500 is substantially similar to knob assembly 108, except knob assembly 500 includes a weight 502. As such, components shown in FIG. 15 are labeled with the same reference numbers used in FIGS. 3 and 6. Although knob assembly 500 is described as including plate 136 for simplicity, knob assembly 500 can include any suitable plate. In the exemplary embodiment, weight 502 includes a center aperture 504 and screw holes 506. Center aperture 504 is configured to receive stem collar 146 and stem 104 (shown in FIG. 3) inserted through stem collar 146. Further, screw holes 506 are configured to align with screw holes 154 when stem collar 146 is received in center aperture 504 to enable fasteners 156 to couple plate 136 and weight 502 to knob 134. Weight 502 is used when, for example, knob 134 is formed from a relatively light-weight material, such as a plastic material. When, for example, knob 134 is formed from a relatively heavy-weight material, such as metal, weight can be omitted, as shown in FIG. 6.

Figure 16:
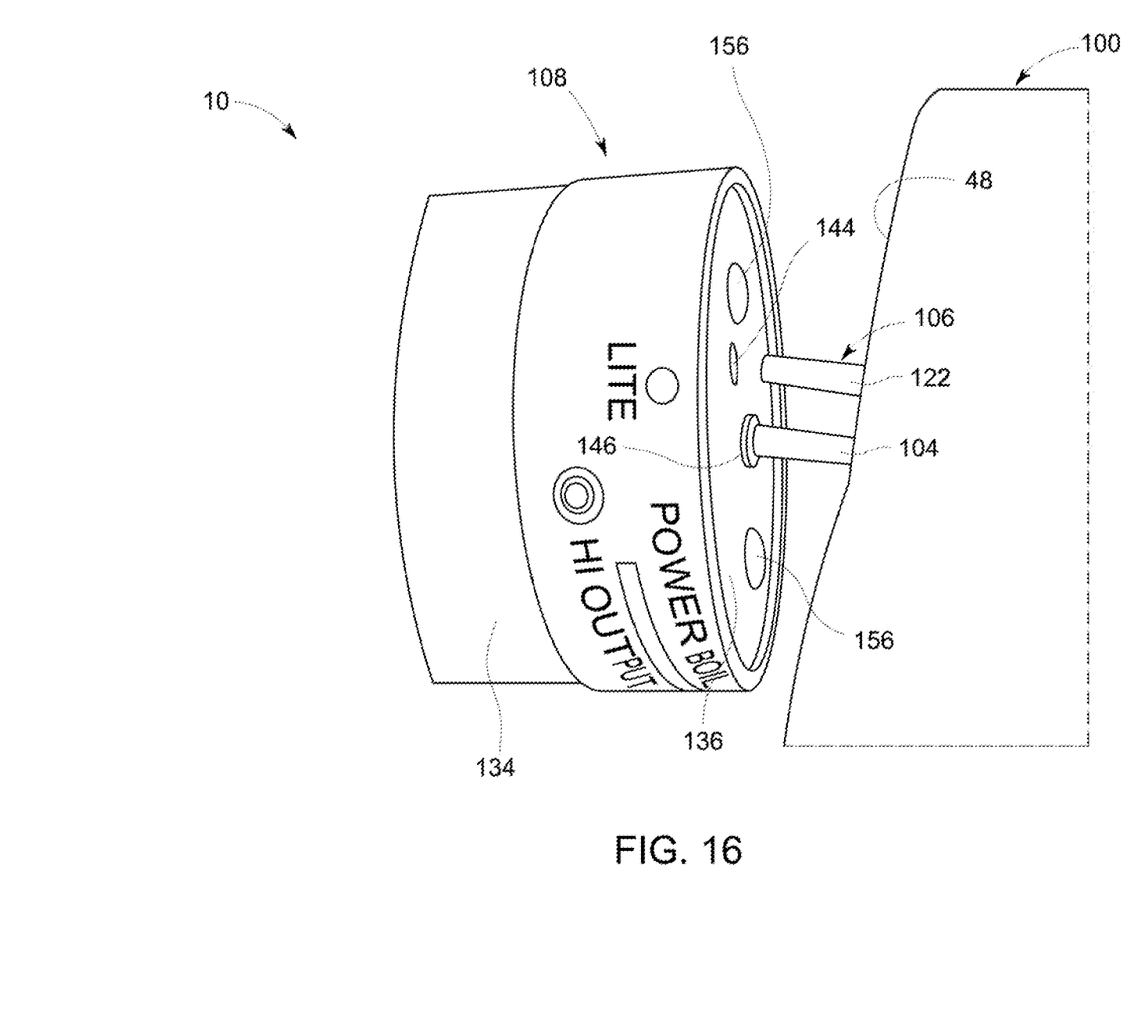
FIG. 16 is a side view of the knob assembly shown in FIG. 6 coupled to a stem of the valve assembly shown in FIG. 3.

FIG. 16 is a side view of knob assembly 108 coupled to stem 104 of valve assembly 100. To assemble valve assembly 100, plate 136 is coupled to knob 134 using fasteners 156 and/or any other suitable coupling technique to form knob assembly 108. When weight 502 (shown in FIG. 15) is used, weight 502 is coupled between knob 134 and plate 136 to form knob assembly 500 (shown in FIG. 15). In the exemplary embodiment, keyed coupling 106 is coupled to stem 104 by inserting stem 104 through body 114 (shown in FIGS. 3 and 4) of keyed coupling 106. Knob assembly 108 is then coupled to keyed coupling 106 and stem 104 by inserting stem 104 through stem collar 146 of plate 136. As knob assembly 108 is slid along stem 104, projection 122 is inserted into keyed slot 144 of plate 136 until knob assembly 108 is positioned against a panel, such as front panel 48, of range 10. If the knob assembly is not the appropriate knob assembly for use with valve assembly 100, projection 122 will not fit within the keyed slot and the knob assembly is prevented from being coupled to valve 102 (shown in FIG. 3). When knob assembly 108 includes plate 400 (shown in FIG. 14), block 408 (shown in FIG. 14) will contact projection 122 and prevent knob assembly 108 from coupling to valve 102.

Figure 17:
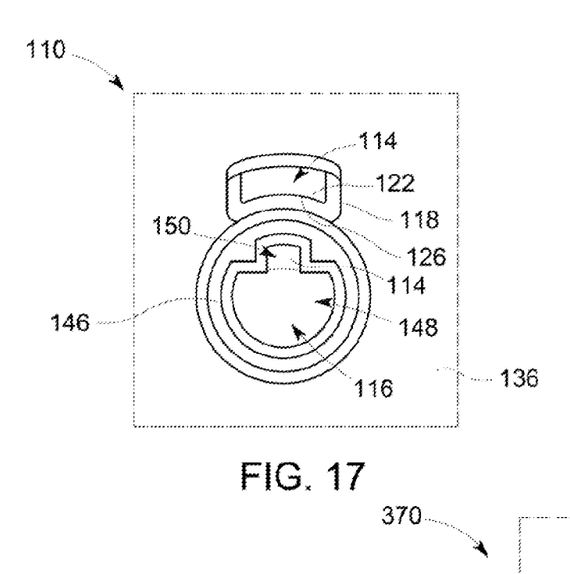
FIG. 17 is a front view of an exemplary coupling assembly including the keyed coupling shown in FIGS. 4 and 5 coupled to the plate shown in FIG. 11.

FIG. 17 is a front view of coupling assembly 110 including keyed coupling 106 (shown in FIGS. 4 and 5) coupled to plate 136. FIG. 17 includes reference numbers described above with respect to FIGS. 3 and 6. As such, components 114, 116, 118, 136, 148, and 150 shown in FIG. 17 are described above. Referring to FIG. 17, when keyed coupling 106 is coupled to plate 136, projection 122 is positioned within keyed slot 144, and collar 146 is adjacent to inner surface 126 of projection 122.

Figure 18:
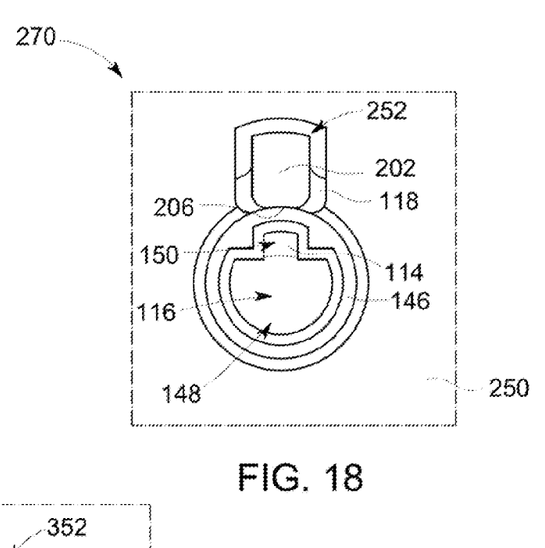
FIG. 18 is a front view of a first alternative coupling assembly including the keyed coupling shown in FIGS. 6 and 7 coupled to the plate shown in FIG. 12.

FIG. 18 is a front view of a first alternative coupling assembly 270 including keyed coupling 200 (shown in FIGS. 8 and 9) coupled to plate 250. FIG. 18 includes reference numbers described above with respect to FIGS. 3 and 6. As such, components 114, 116, 118, 148, and 150 shown in FIG. 18 are described above. Referring to FIG. 18, when keyed coupling 200 is coupled to plate 250, projection 202 is positioned within keyed slot 252, and collar 146 is adjacent to inner surface 206 of projection 202.

Figure 19:
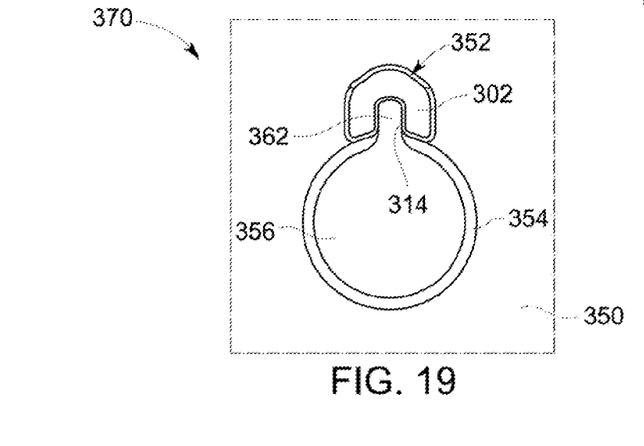
FIG. 19 is a front view of a second alternative coupling assembly including the keyed coupling shown in FIGS. 8 and 9 coupled to the plate shown in FIG. 13.

FIG. 19 is a front view of a second alternative coupling assembly 370 including keyed coupling 300 (shown in FIGS. 10 and 11) coupled to plate 350. FIG. 19 includes reference numbers described above with respect to FIG. 13. As such, components 350, 354, and 356 shown in FIG. 19 are described above. Referring to FIG. 19, when keyed coupling 300 is coupled to plate 350, projection 302 is positioned within keyed slot 352, and ridge 362 is adjacent to inner surface 314 of projection 302.

When an appliance includes a plurality of different types of valves, the appliance also includes a plurality of different types of knob assemblies, wherein each type of knob assembly corresponds to a type of valve. Each type of valve includes a keyed projection having a respective cross-sectional shape, and each type of knob assembly includes a keyed slot having a shape corresponding to the cross-sectional shape of the projection of a respective type of valve assembly. As such, each type of knob assembly only couples to an appropriate type of valve assembly. In the exemplary embodiment, the plurality of different types of valves includes a first valve and a second valve and the knob assemblies includes a first knob assembly corresponding to the first valve and a second knob assembly corresponding to the second valve.

In a particular embodiment, the plurality of different types of valve includes a normal-type valve and at least one special-type valve (e.g. a griddle-type valve), and the plurality of different types of knob assemblies includes a normal-type knob assembly and at least one special-type knob assembly (e.g. a griddle-type knob). The special-type valve includes keyed coupling 106, 200, or 300 (shown in FIGS. 4, 5, and 8-11) and the special-type knob assembly includes plate 136, 250, or 350 (shown in FIGS. 6, 7, 12, and 13) having keyed slot 144, 252, or 352 (shown in FIGS. 6, 7, 12, and 13) corresponding to projection 122, 202, or 302 (shown in FIGS. 4, 5, and 8-11). The normal-type knob assembly includes plate 400 (shown in FIG. 14) having block 408 (shown in FIG. 14) extending therefrom such that block 408 contacts the projection to prevent the normal-type knob assembly from coupling to the special-type valve.

In an alternative embodiment, the plurality of different types of valve includes a first special-type valve (e.g. a griddle-type valve) and a second special-type valve (e.g. a dual-function-type valve), and the plurality of different types of knob assemblies includes a first special-type knob assembly (e.g. a griddle-type knob assembly) and a second special-type knob assembly (e.g. a dual-function-type knob assembly). The first special-type valve includes a first keyed coupling, such as keyed coupling 106 (shown in FIGS. 4 and 5) having a first cross-sectional shape and the first special-type knob assembly includes a first plate, such as plate 136 (shown in FIGS. 6 and 7) having a first-shaped keyed slot 144 (shown in FIGS. 6 and 7) corresponding to the first cross-sectional shape. The second special-type valve includes a second keyed coupling, such as keyed coupling 200 or 300 (shown in FIGS. 8-11), having a second cross-sectional shape and the second special-type knob assembly includes a second plate, such as plate 250 or 350 (shown in FIGS. 12 and 13), having a second-shaped keyed slot, such as slot 252 or 352 (shown in FIGS. 12 and 13), corresponding to the second cross-sectional shape.

A coupling assembly, such as coupling assembly 110, can be included in a kit to retrofit existing valve assemblies or assemble a new valve assembly. More specifically, the kit includes a keyed coupling, such as keyed coupling 106, and a corresponding plate, such as plate 136. To retrofit a valve assembly, keyed coupling 106 is coupled to a stem of the valve assembly, and plate 136 is coupled to a knob. In a particular embodiment, when the kit is provided for an appliance having a plurality of different types of valve assembly and/or burners, the kit includes a plurality of types of keyed couplings and respective plates.

The embodiment described above prevent knobs of different types, having different printed indicia, from being inserted on a stem of a valve that does not operate as intended per the indicia on the knob. More specifically, the above-described coupling assembly described prevents wrong printed indicia knob from being inserted on the wrong gas valve shaft by including a keyed coupling on the valve stein. The keyed coupling allows a knob having a corresponding backer plate to be coupled to the valve stem and prevent knobs having non-corresponding backer plates from being coupled to the valve stem.

Exemplary embodiments of coupling assembly for use with a valve assembly are described above in detail. The methods and apparatus are not limited to the specific embodiments described herein, but rather, components of the apparatus and/or steps of the methods may be utilized independently and separately from other components and/or steps described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A coupling assembly, comprising:
   a keyed coupling configured to couple to a valve stem, said keyed coupling comprising a projection having a cross-sectional shape and a valve stem aperture through which the valve stem extends; and
   a plate configured to couple to a knob and comprising a keyed slot defined therethrough, wherein said keyed slot is shaped to correspond to the cross-sectional shape of said projection to receive at least a portion of said projection when said plate is coupled to the valve stem, and wherein said plate is configured to be coupled to said valve stem in only one orientation.

2. A coupling assembly according to claim 1, wherein said keyed coupling comprises a body and a flange radially extending from said body, wherein said projection extends longitudinally from said flange.

3. A coupling assembly according to claim 2, wherein the cross-sectional shape of said projection comprises a portion of an annular ring about a circumference of said flange.

4. A coupling assembly according to claim 3, wherein said keyed slot is shaped as a portion of an annular ring corresponding to the portion of the annular ring about said flange.

5. A coupling assembly according to claim 1, wherein the cross-sectional shape of said projection is substantially quadrangle-shaped, and wherein said keyed slot is substantially quadrangle-shaped.

6. A coupling assembly according to claim 1, wherein the cross-sectional shape of said projection is substantially polygonal-shaped, and wherein said keyed slot is substantially polygonal shaped.

7. A coupling assembly according to claim 1, wherein said plate further comprises a stem collar defining a stem aperture, wherein the stem collar is configured to receive the valve stem therethrough to couple said plate to the valve stem.

8. A coupling assembly according to claim 1, wherein said plate further comprises a stem collar and an end wall that define a stem recess, wherein the stem recess is configured to receive a portion of the valve stem to couple said plate to the valve stem.

9. The coupling assembly in accordance with claim 1, wherein when said plate is coupled to said knob, said knob is configured to be coupled to said valve stem in only one orientation.

10. A valve assembly, comprising:
    a stem;
    a keyed coupling coupled to said stem and comprising a projection having a cross-sectional shape and a stem aperture through which a stem extends;
    a knob; and
    a plate coupled to said knob, said plate comprising a keyed slot defined therethrough, wherein said keyed slot is shaped to correspond to the cross-sectional shape of said projection to receive at least a portion of said projection when said plate is coupled to said stem, and wherein said plate is configured to be coupled to said stem in only one orientation.

11. A valve assembly in accordance with claim 10, wherein said stem extends through said keyed coupling and at least partially into said plate when said knob is coupled the valve.

12. A valve assembly in accordance with claim 10, further comprising a weight coupled between said knob and said plate to form a knob assembly, said weight including a center aperture configured to receive a stem.

13. A valve assembly in accordance with claim 10, wherein said keyed coupling comprises a body and a flange radially extending from said body, wherein said projection extends longitudinally from said flange and comprises a portion of an annular ring about a circumference of said flange, said keyed slot is shaped as a portion of an annular ring corresponding to the portion of the annular ring about said flange.

14. A valve assembly in accordance with claim 10, wherein the cross-sectional shape of said projection is substantially quadrangle-shaped, and said keyed slot is substantially quadrangle-shaped.

15. A valve assembly in accordance with claim 10, wherein the cross-sectional shape of said projection is substantially polygonal-shaped, and said keyed slot is substantially polygonal-shaped.

16. The valve assembly in accordance with claim 10, wherein when said plate is coupled to said knob, said knob is configured to be coupled to said valve stem in only one orientation.

17. An appliance, comprising:

a valve stem;

a keyed coupling coupled to said valve stem, said keyed coupling comprising a projection having a cross-sectional shape and a valve stem aperture through which a valve stem extends; and a knob assembly coupled to said keyed coupling and said valve stem, said knob assembly comprising a plate coupled to a knob, wherein said plate comprises a keyed slot defined therethrough, said keyed slot being shaped to correspond to the cross-sectional shape of said projection to receive at least a portion of said projection, and wherein said plate is configured to be coupled to said stem in only one orientation.

18. An appliance, comprising:

a plurality of different types of valves assembled on said appliance; and a plurality of different types of knob assemblies coupled to said valves, each type of knob assembly corresponding to a type of valve, wherein each type of valve includes a projection having a respective cross-sectional shape, and each type of knob assembly includes a keyed slot having a shape corresponding to the cross-sectional shape of the projection of a respective type of valve assembly, and wherein said knob assembly is configured to be coupled to said valve in only one orientation.

19. An appliance in accordance with claim 18, wherein the plurality of different types of valve includes a first valve and a second valve and the plurality of different types of knob assemblies includes a first knob assembly and a second knob assembly, wherein:

the second valve includes said keyed coupling and the second knob assembly includes said plate having said keyed slot; and the first knob assembly includes a plate having a block extending therefrom, said block configured contact said projection to prevent the first knob assembly from coupling to the second valve.

20. An appliance in accordance with claim 18, wherein the plurality of different types of valve includes a first valve and a second valve and the plurality of different types of knob assemblies includes a first knob assembly and a second knob assembly, wherein:

the first valve includes a first keyed coupling having a first cross-sectional shape and the first knob assembly includes a first plate having a first-shaped keyed slot corresponding to the first cross-sectional shape; and the second valve includes a second keyed coupling having a second cross-sectional shape and the second knob assembly includes a second plate having a second-shaped keyed slot corresponding to the second cross-sectional shape.

\* \* \* \* \*